(12) United States Patent
Yerli

(10) Patent No.: US 8,862,717 B2
(45) Date of Patent: Oct. 14, 2014

(54) MANAGEMENT OF ONLINE CONTENT IN A NETWORK

(75) Inventor: Cevat Yerli, Frankfurt am Main (DE)

(73) Assignee: Crytek IP Holding LLC, Wilmington, DE (US)

(*) Notice: Subject to any disclaimer, the term of this patent is extended or adjusted under 35 U.S.C. 154(b) by 82 days.

(21) Appl. No.: 13/609,046

(22) Filed: Sep. 10, 2012

(65) Prior Publication Data

US 2013/0198356 A1    Aug. 1, 2013

Related U.S. Application Data

(60) Provisional application No. 61/533,842, filed on Sep. 13, 2011.

(51) Int. Cl.
| | |
|---|---|
| *G06F 15/16* | (2006.01) |
| *H04L 12/24* | (2006.01) |
| *G06Q 50/00* | (2012.01) |
| *G06Q 30/02* | (2012.01) |

(52) U.S. Cl.
CPC ............... *H04L 41/00* (2013.01); *G06Q 50/01* (2013.01); *G06Q 30/02* (2013.01); *G06Q 30/0241* (2013.01)
USPC ............ 709/223; 709/206; 709/219; 370/397

(58) Field of Classification Search
USPC .................................. 709/218, 223; 705/261
See application file for complete search history.

(56) References Cited

U.S. PATENT DOCUMENTS

| | | | |
|---|---|---|---|
| 6,424,981 B1 | 7/2002 | Isaac | |
| 7,689,510 B2 * | 3/2010 | Lamkin et al. | 705/51 |
| 7,707,224 B2 * | 4/2010 | Chastagnol et al. | 707/783 |
| 8,543,665 B2 * | 9/2013 | Ansari et al. | 709/218 |
| 2005/0083858 A1 * | 4/2005 | Loa et al. | 370/254 |
| 2007/0067427 A1 * | 3/2007 | Bugir et al. | 709/223 |
| 2007/0178473 A1 * | 8/2007 | Chen et al. | 435/6 |
| 2008/0040653 A1 * | 2/2008 | Levine | 715/205 |
| 2008/0120294 A1 | 5/2008 | Davis | |
| 2009/0276355 A1 * | 11/2009 | Willmore et al. | 705/40 |
| 2010/0131346 A1 * | 5/2010 | Morgan et al. | 705/14.25 |
| 2010/0179874 A1 | 7/2010 | Higgins | |
| 2011/0035375 A1 | 2/2011 | Bekkerman | |
| 2011/0191246 A1 * | 8/2011 | Brandstetter et al. | 705/59 |
| 2011/0313815 A1 * | 12/2011 | Brandstetter et al. | 705/7.33 |

FOREIGN PATENT DOCUMENTS

| | | |
|---|---|---|
| EP | 1 143 356 A2 | 10/2001 |
| WO | 2008/033840 A2 | 3/2008 |

OTHER PUBLICATIONS

European Search Report mailed Feb. 8, 2013, issued in European Patent Application No. 12 18 7947.2, filed Oct. 10, 2012, 6 pages.
European Search Report mailed Oct. 19, 2012, issued in European Patent Application No. 12 18 2306.6, filed Aug. 30, 2012, 10 pages.

* cited by examiner

*Primary Examiner* — Tesfay Yohannes
(74) *Attorney, Agent, or Firm* — Christensen O'Connor Johnson Kindness PLLC

(57) ABSTRACT

A computer-implemented method for the management of online content in a network is described, wherein all online content is organized in a container or seed that is accessible by users via said network and that consists of main data and at least one metadata attached to the main data.

11 Claims, 6 Drawing Sheets

MANAGEMENT OF ONLINE CONTENT IN A NETWORK

CROSS-REFERENCE TO RELATED APPLICATION

This application claims the benefit of U.S. Provisional Application No. 61/533,842, filed Sep. 13, 2011, the disclosure of which is incorporated by reference herein in its entirety.

TECHNICAL FIELD

The disclosure relates in general to the management of online content in a network environment, in particular in online communities or social networks.

BACKGROUND

Current online communities handle their data in very different formats. This is due to a system that evolved over time and added more and more features, but was not designed to organize the various items it is currently managing.

Users of online communities and social networks are usually identified by their user-specific profiles, which include identifying data and information about their specific preferences. It is known from the prior art that these profiles are regularly monitored, maintained, or modified based on user interactions. User interactions can also be analyzed and matched to the user profiles of other users or friends who are also registered members of an online community or social network.

SUMMARY

The present disclosure relates to a new data type or data structure enabling users to easily retrieve online content and to link, connect, or commonly share online content with other users or friends within an online community or social network in a uniform, intuitive manner. A user retrieving online content encoded with the new data type or data structure automatically causes or offers further interactions of other users or friends, to which the user is connected or linked, and the type of these further interactions of these other users or friends is prescribed by the data included in the seed.

According to the present disclosure, online content is organized in seeds, including content such as videos, audio files, games, applications, blogs, comments, playlists, activities, chats, news, messages, communication media (e.g., video over IP), TV shows, pictures, or even users or groups of users. Seeds are connected or linked to other seeds, forming a network of seeds.

An enhanced approach for the management of online content in a network environment, in particular in online communities or social networks, is described. In particular, the present disclosure provides a new data type or data structure enabling users to easily retrieve online content and to link, connect, or commonly share online content with other users or friends of an online community or social network in a uniform, intuitive manner, and to thereby establish a network of hitherto unknown functionality and vitality.

The present disclosure provides a computer-implemented method for the management of online content in a network, wherein online content is organized in a container, also referred to as a seed, that is accessible by users via said network and that comprises main data and at least one metadata attached to the main data.

According to one embodiment, the main data is online content, such as videos, audio files, games, applications, blogs, comments, playlists, activities, chats, news, messages, communication media (e.g., video over IP), TV shows, pictures, or users or groups of users, wherein the at least one metadata indicates how a seed shall be handled if retrieved by a user.

According to another embodiment, the metadata offers predetermined actions to other users of the network retrieving a container or seed.

According to another embodiment, the containers or seeds are connected or linked to other containers or seeds to thereby form a network of containers or seeds.

A further aspect of the present disclosure relates to a computer system for running a social network consisting of a plurality of members, said computer system being configured for performing one or more of the described methods.

A further aspect of the present disclosure relates to a computer-readable storage medium having stored thereon program instructions executable by a processor for performing one or more of the described methods.

BRIEF DESCRIPTION OF THE DRAWINGS

Hereinafter, embodiments of the present disclosure will be set forth in an exemplary manner and with reference to the enclosed drawings, from which further features, advantages, and technical effects achieved will become apparent. In the drawings.

DETAILED DESCRIPTION

A seed is a core element of a new type of database in a cloud/server environment. All social media objects that are managed by the system can be handled in the same way, no matter if the social media object includes a blog, a video file, or a representation of a user or a group of users or others. For example, every seed can have seed content and a few basic parameters, and might have additional parameters. A seed can be live, real-time content; seeds are persistent over time and can grow in size.

A seed may have one or more dimensions that can grow and shrink in size. For example, a seed related to a chat (referred to as a chat seed) may include one or more parameters indicative of the participants of the chat. Accordingly, the parameters may grow and shrink with regard to a change of the current amount of participants of the chat. More users can join a chat represented by the chat seed and enlarge the amount of participants, or leave the chat and shrink the size of the chat seed. Another example of growing of a seed includes adding of content to the seed, such as text messages of a chat added to a chat seed. Each added chat message may enlarge information content and the respective parameters of the chat seed.

According to another example, if a user starts a game, a seed related to the game (referred to as a game session seed) may be created. Other users can join the game session and leave it again, thereby increasing or decreasing the size of the respective game session seed. Furthermore, persistent items of the game session may also increase the size of the game session seed, such as achievements gained by the users participating in the game session, or statistics that may be persistently stored. Even though the game session may be terminated after the last user left the game session, the respective game session seed may still be stored. Therefore, the game session seed can be referenced by other seeds in order to retrieve the information stored in the game session seed, such as achievements and statistics.

A seed can have a parent, child, neighbors, or other hierarchical or technically organized relationship structures.

Example: A video seed could have a video response seed as a child attached to it, which can have a comment-seed attached to it.

Seeds also can be connected across many servers and clouds, through multiple seed servers, from different seed-server operators.

Figure 1:
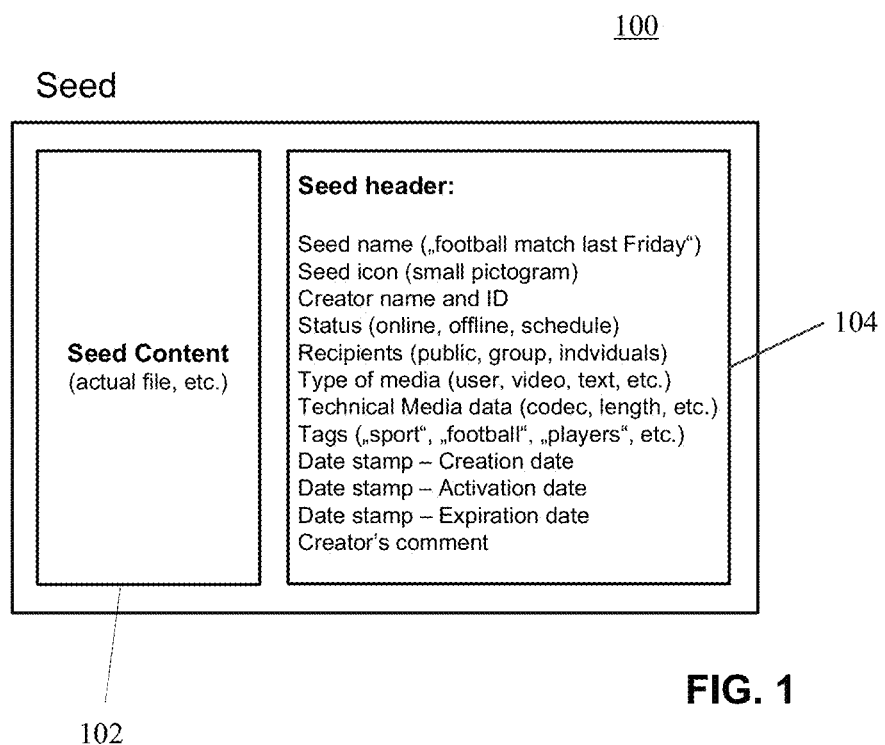
FIG. 1 is a schematic block diagram of an embodiment of a data container, referred to as a seed, including online content and specific metadata.

FIG. 1 is a schematic block diagram of an embodiment of a data container, referred to as a seed, including online content and specific metadata. The seed 100 contains an actual data file 102 (referred to as the seed content), which is retrievable via the network, and related metadata 104, which will be outlined below in more detail and of which FIG. 1 only lists a few examples. The metadata 104 may be stored as a series of keys and values in a key-value store for metadata. Metadata can also include additional information about the seed itself, about its content or about users interacting or engaging with the seed, which will be outlined below in more detail.

Parameters

According to an embodiment, seeds can have the following parameters. Yet, not all of the parameters are required. Parameters can vary based on factors such as seed type, as described below:

Seed ID (Basic Parameter):

Every seed has a unique ID created by the system, which can be used to ensure a precise targeting of the respective seeds.

Creator (Basic Parameter):

The user (ID) who created the seed. This can be someone other than the current owner of the seed.

Recipient (Basic Parameter):

Seeds this seed is addressed to can be listed as recipients. Recipients can be single seeds (to individually target one or more seeds), a group of seeds, all seeds (e.g., public), or self (creator only).

For example, the public can be targeted by addressing a seed as "public," "all," or similar terms, and in some cases leaving Recipient blank may address a seed to the public. Further, the recipient might be the creator's address itself, so it becomes a stored seed in his seed library.

Creation Date (Basic Parameter):

The date the seed was created online. For example, for a user this is the date the user created his online User ID seed.

Seed Type (Basic Parameter):

Each seed is of a specific type, e.g., a user, video, blog, etc. New types can be generated (e.g., by the system developers) at any time. This will add a different set of parameters to the seed, and possibly create one or more types of new parameters. A seed type defines what actions the recipient(s) can perform. The seed type can be transparent to the users who receive the seeds, but addressed by the system for defining the actions users can perform.

For example, default actions on a video seed might be to play the video seed, but in cases of more advanced setups, a video seed might require a "rent" action to be consumed. The rent action implies that the user who wants to watch the video has to first pay for the content before he is permitted to watch it.

Actions (Basic Parameter):

Each seed has certain actions assigned to it, such as social or content-based actions, including but not limited to, sharing, buying, playing, chatting, or responding to the seed. These actions are triggered once a user retrieves the seed, e.g., by means of a pointing device, such as a computer mouse, stylus, or by means of a touch on a touch-sensitive display.

Owner:

The current user managing the seed. This does not have to be the creator. For example, a group can be the creator, but one member of the group may be in charge of managing the seeds.

Link Permission:

The owner can set permissions for the different user levels to link to the seed, e.g., which users (friends, followers, public) are able to link to this seed.

Connect Permission:

The owner can set permissions, such as private, shared, public, and other suitable permissions, for the different user levels to connect to the seed, e.g., which users (friends, followers, public) are able to connect to this seed. For example, a public seed may be accessible by all users of the network environment. It may also be visible (but read-only) to the public internet, such as anonymous users, robots, and other public users or network entities which are not registered or known by the network environment. A shared seed may, for example, be accessible by all users that have a connection to the owner of the seed. Accordingly, all users connected to the owner may be implicitly set as participants of a shared seed. Changes in the owner's connections may be immediately reflected in the accessibility of the shared seed. A private seed may, for example, have a dedicated list of participants, which may be the recipients of the seed. Only the owner may be enabled to add or remove participants, however, participants may choose to leave or quit the seed.

Seed Name:

An optional, short name of the seed. The name does not have to be unique, as the internal ID makes sure every seed has a unique ID.

Seed Icon:

Every seed has a default icon. Based on the system's setting, this might be a default icon based on the type of seed. The owner of the seed can change this icon at any time. In default cases, the icon can be either the creator's icon or one icon defining all seeds and can be a matter of design choice.

Status:

The seed has a status such as in-context, engaged, live, online, offline, or scheduled (e.g., switching via a schedule automatically to online or offline). In-context can be defined by various other seeds, such as a "gamename" seed, which can modify another engaging seed into the context of "in-gamename." For example, if somebody plays a game, that user can turn playing the game "Crysis 3" via the in-context status defined by a "gamename" seed indicating "Crysis 3."

Status Schedule:

By default, the schedule of any seed is turned off. The owner can turn it on and enter certain dates so the seed will go online or offline at certain times. The schedule can be updated, changed, or deleted at any time.

Social Statistics (Social Impact):

Implicit data is collected for each seed, such as a number of stars, votes, ratings, user-views, and user-action telemetry that the creator might find interesting to allow a new type of action on an online, live content seed.

Future Date:

This date defines when the seed will be visible online, or expressing an intention of the seed, e.g., future activity intent, or future TV-show release. This date can change and can be reset by the owner.

Expiration Date:

This date defines when the seed is no longer active, e.g., when it cannot be accessed anymore other than by the owner.

Tags:

The tags of a seed help users to find and sort seeds and help the system to organize seeds into clouds called shared interest clouds. Each tag also has a weight that can change over time to show how useful this tag is in terms of its organization inside the cloud.

Each seed can have more than one tag so it can be defined as precisely as possible. The tag creation process can be automated and not explicitly done by a user. Tags may be derived from the content of the seed and/or any computers or "buds" (prioritized messages) attached to the seed, which will be outlined below in more detail. Tags may be used by a recommendation component of the network environment, such as a recommendation engine, to implicitly link seeds with each other. Tags may be completely managed by the network environment and may be hidden to users of the network environment.

Technical Seed Information:

Depending on the type, the seed can have additional information about the content. These data can be either gathered automatically or entered by the owner. For example, a picture seed could have additional information about the size, resolution, color depth, layers, etc., of the picture.

Attach Advertisements:

The owner of the seed can attach one or more advertisements to the seed. Advertisements can also be assigned via the tags that are specific to advertisement targeting. Essentially, the owner can target the ad space of the seed to anyone to deliver targeted advertisements based on specific advertisement-related tags.

Seed Description:

The creator or current owner can add a description to the seed. This may be a simple text or could be a connection to another seed.

Comments:

Comments can be user-generated comments, independent from the creator, but may be either embedded or in a separate seed connection focused on comments. Further to comments, participants or recipients of a seed may be allowed to add prioritized messages to the seed, also referred to as "buds." Similar to comments, buds may be attached to or embedded in a seed. Only participants or recipients of a seed may be allowed to read attached or embedded buds.

Creating a Seed

Figure 2:
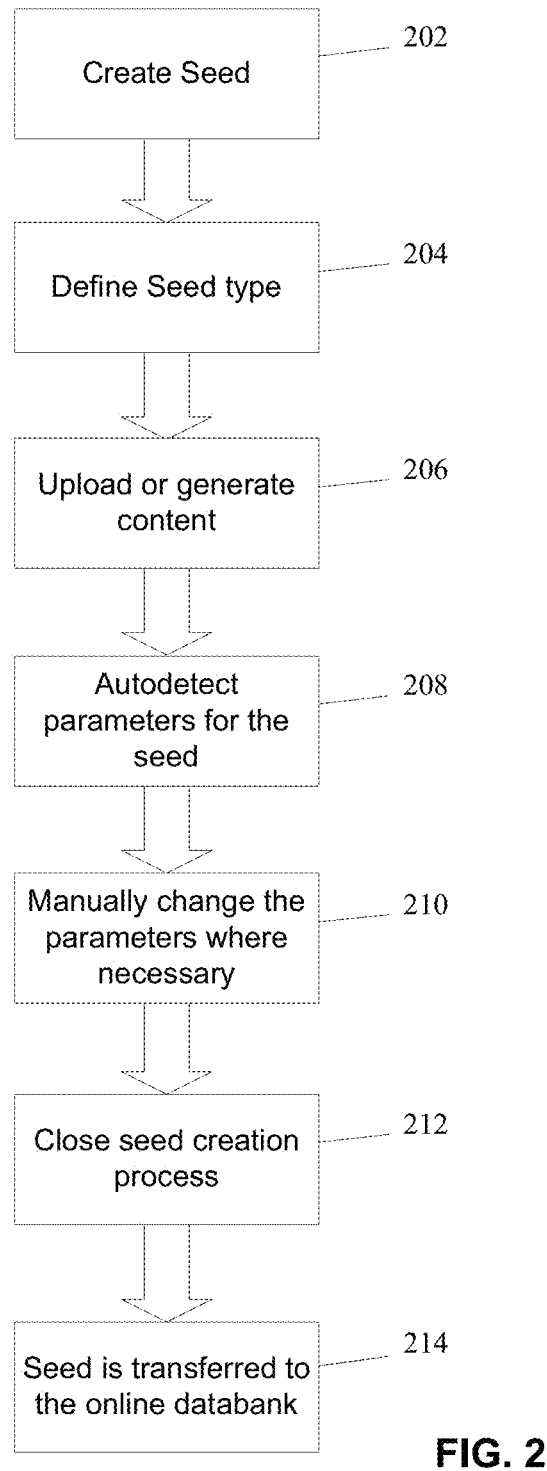
FIG. 2 is a schematic flow diagram showing a process for creating a seed, and transferring the seed to an online database managing online retrieval of the seed by other users of a network, according to an embodiment.

FIG. 2 is a schematic flow diagram showing a process for creating a seed, and transferring the seed to an online database managing online retrieval of the seed by other users of a network.

To create a seed, a user can log in to the online community system where he wants to create a seed 202. He activates the creation process by defining a seed type (e.g., video file, a picture, etc.) 204. If he wants to create a new user, he does not have to log in. But even a logged-in user can create a new user (which will also automatically create a connection between the two users).

After the type of seed is defined 204, the system will prompt the user to add the specific content for the seed 206, e.g., uploading a video file, or entering a text and a design template for a blog entry.

As shown in FIG. 2, the parameters for the seed may be detected automatically 208, e.g., in order to provide a proposal to a user, who may then, in a subsequent step 210, manually change the parameters if necessary. Once completed, the seed creation process is closed or terminated 212 and the seed is transferred to the online database of a server/cloud computing environment 214, where it can be retrieved by other users of the network.

Link, Connect, and Share

The system makes a distinction between linking to a seed and connecting to a seed.

Link:

If a user links to a seed, the user establishes a passive, asymmetrical link to the seed. The user will be notified (although notification can be turned off or on) about any changes and/or updates of and from the linked seed and can create a bookmark on the seed to find it again quickly. However, the user does not require an agreement from the linked seed to perform a link. In other words, the user is following the linked seed as a follower. The linked seed can perform a query to see who and what is linked to itself.

For example, if user "B" is linked to user "A," user "A" can see that user "B" has linked himself to user "A," but user "B" does not need a confirmation from user "A."

A user seed "A" may link to a content seed "C" and be notified about a content seed update over time, receiving an implicit update about seed changes.

Connect:

If a user connects to a seed, the user establishes a symmetrical connection to the seed, where both seeds (the user connecting and the seed being connected) are aware of the connection. To establish such a connection, both owners of the two seeds have to agree to the connection, e.g., the owner of the seed that has been connected has to either agree to allow the connection or not allow the connection. Only if the connection is allowed is the connection actually established.

Share:

A user can define a seed to be shared with certain target seeds (friends, individual(s), groups, public, etc.), but also by a connection or a linked state.

For example, a user may desire to share the user's seed storage with the user's linked public; in other words, everyone that is linked to the user has access to the shared seed. The sharing status and the link or connect status are independent from each other, such that a seed "A" that is connected to a group "B" can also be shared with a group "C." Group "B" and group "C" might be completely different users, but can also overlap. Depending on how a user is linked, connected, or sharing another seed, he will be notified (or not) of any updates. A user can explicitly allow or block the linking, connecting, or sharing to any other user or seed.

Seed Actions

Every seed allows certain actions for the user. These actions are organized in content actions, e.g., use the content of the seed, and social actions, e.g., create a social interaction with the seed. The owner of the seed can also connect advertisement seeds with the seed.

Some actions create another seed, e.g., responding to a seed creates a seed connected to the original seed that contains a response in the form of any media, such as video, audio, text, etc.

Figure 3:
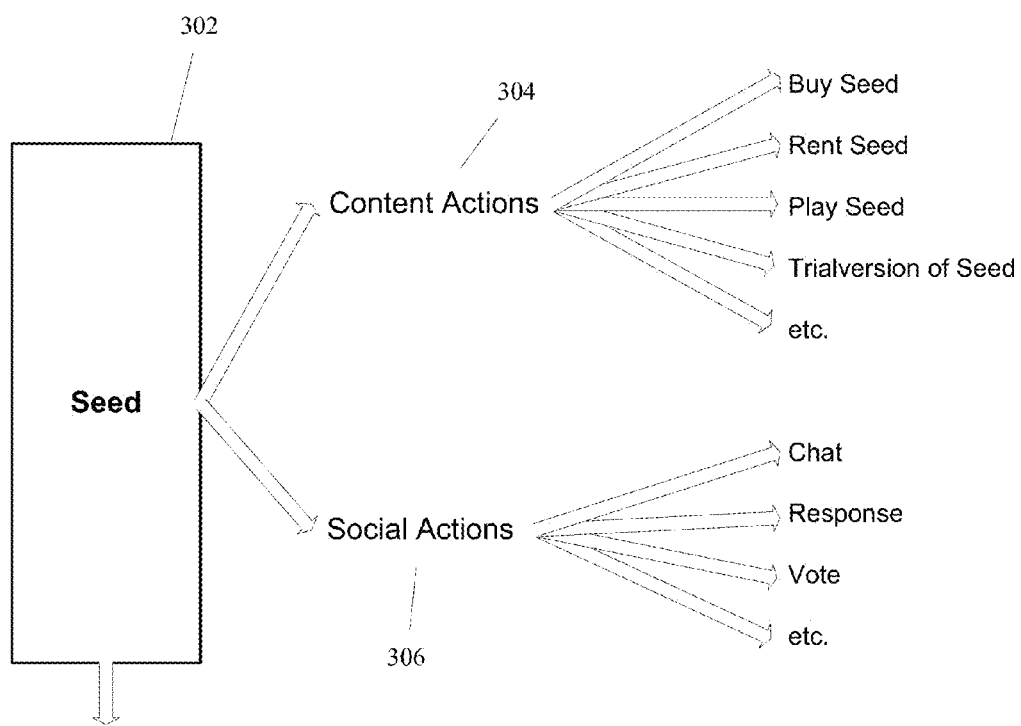
FIG. 3 schematically shows a network organization based on seeds that are retrievable online by the users of the network, according to an embodiment.

FIG. 3 schematically shows how, according to an embodiment, a network is organized based on seeds that are retrievable by the users of the online network. As shown in FIG. 3, the seeds 302 that are retrieved by other users, e.g., users or friends to which the original user may be connected or linked, cause the other users to create new seeds that, if retrieved by other users, cause further seeds.

As an example, FIG. 3 shows seeds for "content actions" 304, such as a "buy seed" for buying a good or service, a "rent seed" for renting a good or service, a "play seed" for playing, e.g., a videogame, a "trial version of seed" for requesting a trial version, etc., and for "social actions" 306 in a network, such as chatting, responding to a message or request, voting about a topic in an online community or social network (e.g., via a vote button displayed on a graphical user interface), etc.

Searching for Seeds or Content

All seeds of the network are indexed and categorized explicitly and implicitly by their tags and explicitly and implicitly by the connections or links to other seeds.

Seeds that are created by friends, e.g., users that another user is connected to, will be automatically sent to the user. These automatically pushed seeds are displayed on an appropriate page of the user's profile.

Example of a Seed Network

In general, the seeds form a network of connected and linked seeds. The example shown in FIG. 4 explains the creation of such a network 400.

Figure 4:
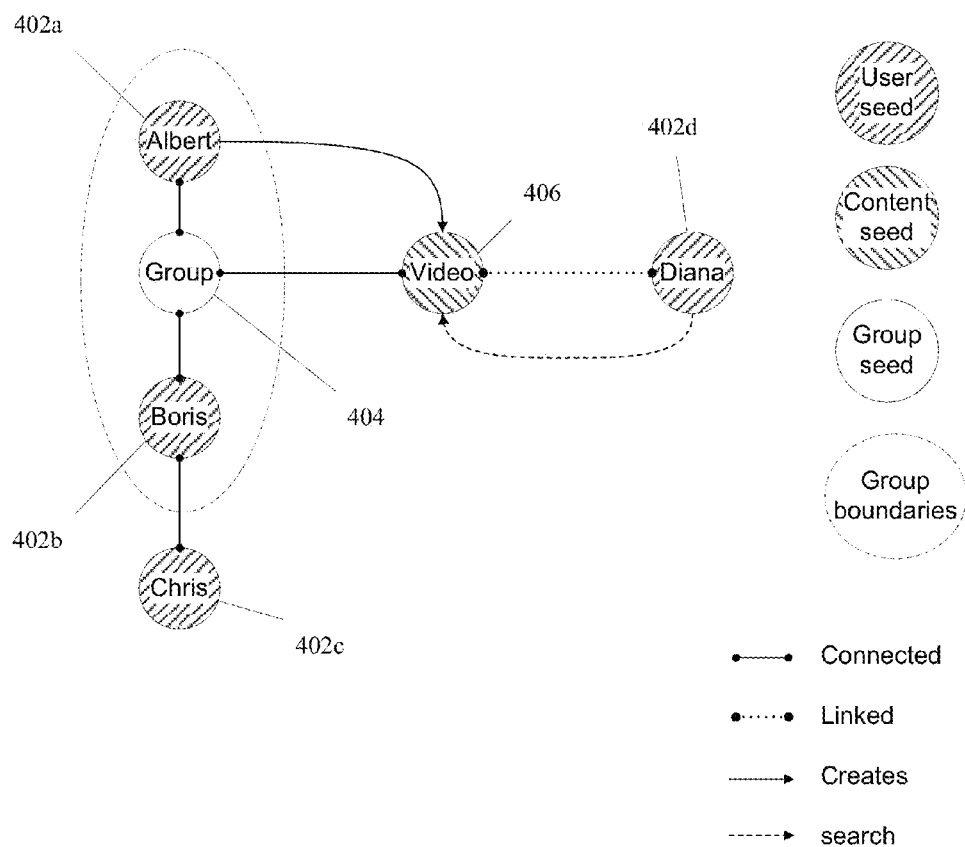
FIG. 4 is a schematic example of a seed network, according to an embodiment.

According to FIG. 4, the users Albert (corresponding to user seed 402a) and Boris (corresponding to user seed 402b) are members of the same group 404. Boris has another friend Chris (corresponding to user seed 402c), who is not part of the group 404. Albert is uploading a video and creating a content seed 406. The content seed 406 is automatically connected to his user seed 402a. The video seed 406 also gets connected to Boris' user seed 402b, because it is in direct contact, i.e., connected, to Albert's user seed 402a. Chris' user seed 402c is not connected to the video 406, as he is neither connected to the group 404 nor to Albert.

The user Diana (corresponding to user seed 402d), who is not connected to any users mentioned above, is able to search the network for videos and can find (among other content) the video seed 406 created by Albert. With the search she is now linked to the video seed 406, but will not get any automatic links or connections to the already established network "behind" that video seed 406. Neither Albert nor anyone in group 404 will see the link to Diana's user seed 402d.

Seed Types

The following list shows exemplary types of seeds. However, the present disclosure is not limited to the listed types. More types are possible and can be added any time (e.g., by a community administrator).

Seed types may include:
user;
group of users;
media file (video file, audio file, etc.);
text;
blog page;
blog entry;
chat;
response or comment on another seed;
future activity;
generic uploaded file;
online usable file (to be started by an online application);
archive file;
advertisement (different types are possible, such as an image, text, video, etc.);
application;
plug-in for an application;
game;
add-on for a game (e.g., a level, a character).

Accordingly, seeds may be typed. Based on the type, each seed may serve a payload for the specific content of the seed. Typing of seeds enables a plug-in of new kind of content and behaviors without affecting or interfering with existing content types (and their respective seeds) and their consumers. Seed types may be pre-defined and may be managed by the network environments, for example, by an engine driving the network environment.

Furthermore, seeds can be categorized. A category of a seed may be represented as a label, which can be used to classify a typed seed, for example, into one or more subtypes. Based on the category, specific behaviors and styles may be applied to the seed. For example, a seed related to a "talk" may be categorized as a blog or chat.

Example of a Seed Implementation in XML Format

In the following, exemplary embodiments for practically implementing a seed according to one embodiment in a network or cloud computing environment are set forth.

An XML format is described as an example. As will be apparent to a person skilled in the art, however, a seed according to one embodiment can be of any format that can be read and interpreted by the system that is using the seeds. The present disclosure is not limited to the XML format.

Creator Seed

One example is a seed that is generated but not yet uploaded, so it is still without a unique reference ID, but already contains all other relevant information.

A header may contain a name, comment, icon reference, and the like. As long as the seed is not uploaded it has no ID of its own.

```
<?xml version="1.0" encoding="UTF-8"?>
<seed>
    <name>Football match last Friday</name>
    <icon>http://someassetserver.com/assets/football.png</icon>
    <description>
        <text>I visited this match last Friday and there were ...</text>
        <seed-ref>2ed51371-dc5e-4550-a508-2dc1a28b9a53</seed-ref>
    </description>
```

Creator and owner information may contain a reference targeting the ID of the creator/owner, i.e., a link to a user seed.

```
<creator>
    <seed-ref>18e85aa3-8823-45ab-97cc-fd40778cf68e</seed-ref>
    <!-- e.g., a group -->
</creator>
<owner>
    <seed-ref>28ec0ea7-fa01-48fb-9292-e767d55903e8</seed-ref>
    <!-- e.g., a user -->
</owner>
<status>online</status>
```

Users or seeds that are allowed to receive this seed are specified as recipients. Typical groups can be defined, such as friends, public, etc., as much as specific users.

```
<recipients>
    <seed-ref>7ba92321-69a0-4e5e-93b6-75f021aa3b67</seed-ref>
    <!-- user -->
    <seed-ref>9665e604-464a-4bb5-b7d5-799f5cda1348</seed-ref>
    <!-- user -->
    <seed-ref>ce5f3ca3-90ea-4f6a-80d0-4db61f609672</seed-ref>
    <!-- user -->
    <seed-ref>830ac9d6-e9ba-47a8-9711-085fb58868e2</seed-ref>
    <!-- group -->
```

```
</recipients>
<!-- public
<recipients>
    <public />
</recipients>
-->
```

Furthermore, a possible shortcut may be specified, in case no other recipients are defined.

```
<!-- also public, when recipients list is empty
<recipients />
-->
```

Setting the seed to "private" locks the seed from everyone but the owner.

```
<!-- private (owner only)
<recipients>
    <self />
</recipients>
-->
<!-- all of my friends
<recipients>
    <friends />
</recipients>
-->
```

All parameters defining the actual content to follow may be specified. These data are not parsed by the system, but relayed to whatever application can use the contained data. The example shows a video seed, thus parameters define the necessary information of the video, like length, format, size, codec, etc.

```
<media>
    <type>video</type>
    <data>
        <length>00:02:32</length> <!-- hh:mm:ss -->
        <bitrate>32000</bitrate> <!-- Kbps -->
        <size>1280x720</size>
        <ratio>16:9</ratio>
        <mimetype>video/mp4</mimetype>
        <codec>H.264</codec>
        <audio>
            <mimetype>audio/mpeg</mimetype>
            <codec>mp3</codec>
            <bitrate>320</bitrate> <!-- Kbps -->
            <channel>2.0</channel> <!-- 2.0 means stereo, e.g. surround 5.1 -->
        </audio>
    </data>
</media>
```

Tags are needed to place the seed inside the interest cloud, including an optional weighting of each tag.

```
<tags>
    <tag weight="10">sport</tag>
    <tag weight="50">football</tag>
    <tag weight="20">players</tag>
    <tag weight="3">energy drink</tag>
</tags>
```

Actions that are available with this seed may be specified in addition to the default actions. In this case, playback of the video is a default action to all permitted users; in addition all users can respond and vote on the seed.

```
<actions>
    <!-- play is already default as this is a video seed -->
    <action>respond</action>
    <action>vote</action>
</actions>
```

Permissions define who can do which social actions, such as linking the seed to other users.

```
<permissions>
    <link>
        <public /> <!-- anyone can link to this seed -->
    </link>
    <connect>
        <friends /> <!-- only friends can connect with this seed -->
    </connect>
    <share>
        <!-- only following individuals may share this seed -->
        <seed-ref>ce5f3ca3-90ea-4f6a-80d0-4db61f609672</seed-ref>
        <!-- user -->
        <seed-ref>830ac9d6-e9ba-47a8-9711-085fb58868e2</seed-ref>
        <!-- group: all members of this group may share -->
        <friends />
    </share>
</permissions>
```

The seed may include history, like creation date and lifespan, and a schedule when the seed will be active or not.

```
<created>2010-05-20T11:13:19.037+02:00</created>
<active>2010-07-01T00:00:00.000+02:00</active>
<expires>2010-07-31T23:59:59.999+02:00</expires>
</seed>
```

Active Uploaded Seed

Another example refers to a typical seed that is already uploaded and can be accessed by users.

In the header, the difference from the seed above is the already given ID, which is handed over to the seed the moment the seed is stored online.

```
<?xml version="1.0" encoding="UTF-8"?>
<seed>
    <id>56e9a666-eb5c-4f9c-9650-ccae8dd1d888</id> <!-- generated by the system -->
    <name>Football match last Friday</name>
    <icon>http://someassetserver.com/assets/football.png</icon>
    <description>
        <text>I visited this match last Friday and there were ...</text>
        <seed-ref>2ed51371-dc5e-4550-a508-2dc1a28b9a53</seed-ref>
    </description>
    <creator>
        <seed-ref>18e85aa3-8823-45ab-97cc-fd40778cf68e</seed-ref> <!-- e.g., a group -->
    </creator>
    <owner>
```

-continued

```
      <seed-ref>28ec0ea7-fa01-48fb-9292-e767d55903e8</seed-ref> <!-- e.g., a user -->
   </owner>
   <status>online</status>
   <recipients>
      <seed-ref>7ba92321-69a0-4e5e-93b6-75f021aa3b67</seed-ref> <!-- user -->
      <seed-ref>9665e604-464a-4bb5-b7d5-799f5cda1348</seed-ref> <!-- user -->
      <seed-ref>ce5f3ca3-90ea-4f6a-80d0-4db61f609672</seed-ref> <!-- user -->
      <seed-ref>830ac9d6-e9ba-47a8-9711-085fb58868e2</seed-ref> <!-- group -->
   </recipients>
   <!-- public
   <recipients>
      <public />
   </recipients>
   -->
   <!-- also public, when recipients list is empty
   <recipients />
   -->
   <!-- private (owner only)
   <recipients>
      <self />
   </recipients>
   -->
   <!-- all of my friends
   <recipients>
      <friends />
   </recipients>
   -->
   <media>
      <type>video</type>
      <data>
         <length>00:02:32</length> <!-- hh:mm:ss -->
         <bitrate>32000</bitrate> <!-- Kbps -->
         <size>1280x720</size>
         <ratio>16:9</ratio>
         <mimetype>video/mp4</mimetype>
         <codec>H.264</codec>
         <audio>
            <mimetype>audio/mpeg</mimetype>
            <codec>mp3</codec>
            <bitrate>320</bitrate> <!-- Kbps -->
            <channel>2.0</channel> <!-- 2.0 means stereo, e.g. surround 5.1 -->
         </audio>
      </data>
   </media>
   <tags>
      <tag weight="10">sport</tag>
      <tag weight="50">football</tag>
      <tag weight="20">players</tag>
      <tag weight="3">energy drink</tag>
   </tags>
   <actions>
      <!-- play is already default as this is a video seed -->
      <action>respond</action>
      <action>vote</action>
   </actions>
   <permissions>
      <link>
         <public /> <!-- anyone can link to this seed -->
      </link>
      <connect>
         <friends /> <!-- only friends can connect with this seed -->
      </connect>
      <share>
         <!-- only following individuals may share this seed -->
         <seed-ref>ce5f3ca3-90ea-4f6a-80d0-4db61f609672</seed-ref> <!-- user -->
         <seed-ref>830ac9d6-e9ba-47a8-9711-085fb58868e2</seed-ref> <!-- group: all members
of this group may share -->
         <friends />
      </share>
   </permissions>
   <created>2010-05-20T11:13:19.037+02:00</created>
   <active>2010-07-01T00:00:00.000+02:00</active>
   <expires>2010-07-31T23:59:59.999+02:00</expires>
```

Following the main data of the seed are the comments, which are added as a continuous stream. These comments also are seeds and are referenced within this seed.

```
<comments>
    <comment  when="2010-07-01T14:08:55.229+02:00"
who="7ba92321-69a0-4e5e-93b6-75f021aa3b67">
        <text>This is awesome!</text>
    </comment>
    <comment  when="2010-07-04T22:51:18.007+02:00"
who="ce5f3ca3-90ea-4f6a-80d0-4db61f609672">
        <text type="RTF"><red>Did you see already
this?</red></text>
        <seed-ref>a195b787-95e7-4614-ae58-6f4db3ef7466</seed-ref>
    </comment>
</comments>
</seed>
```

User Seed

A user seed, according to an example, describes a user and the data stored with the user.

The header may list such information such as name, icon, etc. Most important is the ID that is the main link to the user's connected other seeds.

```
<?xml version="1.0" encoding="UTF-8"?>
<seed>
    <id>56e9a666-eb5c-4f9c-9650-ccae8dd1d888</id> <!-- generated
    by the system -->
    <name>John Doe's profile</name>
    <icon>http://someassetserver.com/assets/avatar_johndoe.png</icon>
    <!-- some seed properties (creator, owner, ... -->
```

Even a user is represented as a "media type." The type "user" has its own parameters, such as name, birth date, current location, and the like.

```
<media>
    <type>user</type>
    <data>
        <firstname>John</firstname>
        <lastname>Doe</lastname>
        <birthdate>1981-07-12</birthdate>
        <country>US</country>
        <!-- some more -->
    </data>
</media>
```

Other data like tags, actions, permissions, and such, are in a format identical to other seeds.

```
    <!-- some more seed properties (tags, actions, permission, ...) -->
</seed>
```

Figure 5A:
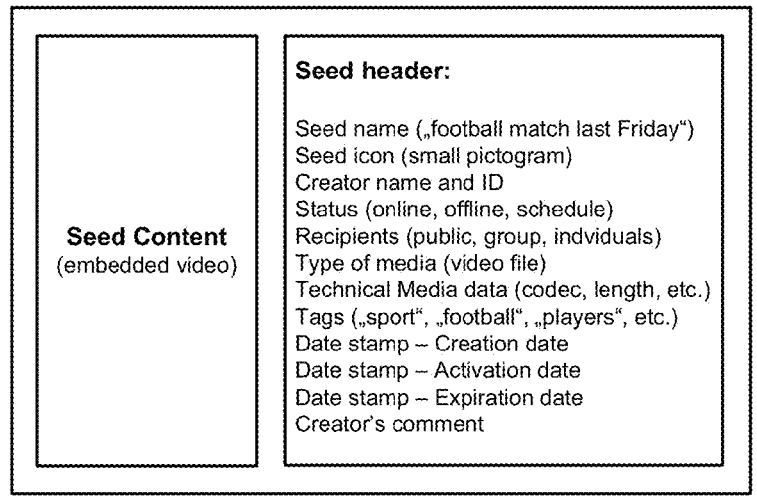
FIGS. 5A-5D are further examples of data containers or seeds.

One example of a simple version of a seed is a video seed, as shown in FIG. 5A, which contains passive content that is available to be played back.

A user can upload a video. The uploading of the video creates a new seed. The user can automatically or manually define certain parameters.

For example, the user uploads a video showing his friends playing football. The user names the video accordingly, sets it to "viewable by friends," and assigns tags so the user's connected friends are enabled to automatically see the video seed in the correct context.

Figure 5B:
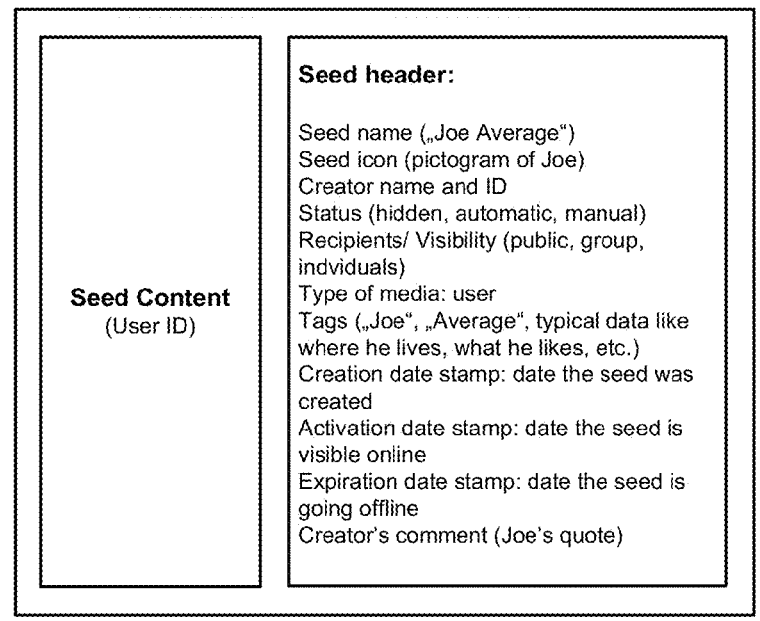

FIG. 5B shows a user seed, which can be created when a new user who is not yet part of the community enters the system and is asked to create a user account. This starts a creation process that generates a new seed, according to one example, also called a user seed. The example below contains standard data a user can enter to define his user seed.

All content the user creates can be linked to the user's user seed.

Figure 5C:
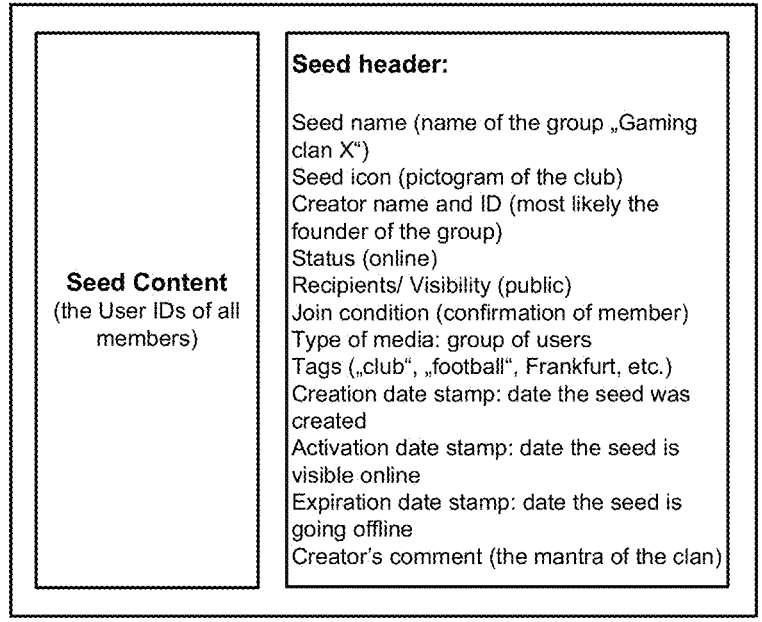

Using a seed, according to an example as shown in FIG. 5C, a user can create a user group seed by asking at least one other user to join a group. With at least two users, a group seed is generated. The creator of the group can set several parameters to define the group, quite similar to creating a user account. More users can join the group depending on the settings, e.g., friends of members may be automatically confirmed, others may need confirmation of the owner, etc.

Figure 5D:
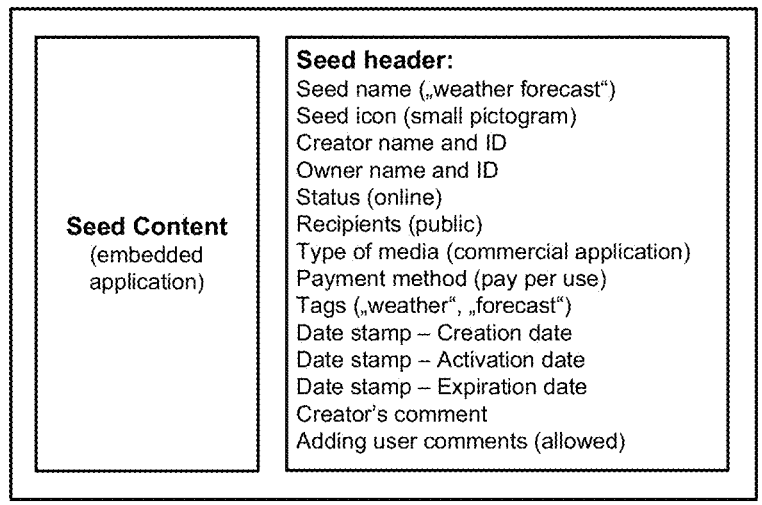

Furthermore, as shown in FIG. 5D, a user uploads an application as a seed, according to an example, also called a "commercial application" seed. Other users can use the seed/application. The moment the user wants to use it, the system checks for the method of payment and unlocks the application after the payment is completed.

If the owner allows other users to add comments, any user can add a comment (in the form of a new seed) to the application seed.

In summary, the present disclosure relates to a method to handle all kinds of online content in a container called a seed. A seed comprises the actual content or main data that is available online and metadata attached to it. This metadata defines who can interact with the seed, what the seed can do, and who created the seed, among other information.

According to an embodiment, the system knows via the metadata what to do with the seed and automatically offers certain actions to other online users in conjunction with the seed.

According to this system, online content is organized in seeds, including content such as videos, audio files, games, applications, blogs, comments, playlists, activities, chats, news, messages, communication media (video over IP), TV shows, pictures, or even users or groups of users. Accordingly, a seed may be regarded as a unified container for all activities, communication, and any type of media and may provide context-driven actions based on a type of the activity, communication, or media type.

Seeds are connected or linked to other seeds forming a network of seeds.

In a computer-implemented system according to an embodiment, online social media content and entities are organized in a unified flexible format that is extensible and permits the seed encoder to properly retrieve, process, and activate the seeds. The data structure or data type, according to an embodiment, defines how these entities called seeds interact with each other, for example, in two different ways as either connected or linked seeds. These seeds and interactions basically form the network, such as an online community or social network. Users can interact within the network structure through content-based and social-based actions.

While various embodiments have been described above, it should be understood that they have been presented by way of example only, and not limitation. For example, any of the elements associated with the social network engine may employ any of the desired functionality set forth hereinabove. Thus, the breadth and scope of the claimed subject matter should not be limited by any of the above-described exemplary embodiments.

What is claimed is:

1. A computer-implemented method for management of online content in a network, including:
   organizing online content in a seed that is accessible by users of the network via said network and that comprises main data and at least one metadata attached to the main data, wherein the seed is connected or linked to other seeds to thereby form a network of seeds;
   linking a seed associated with a user of the users of the network to at least one other seed, thereby establishing a passive, asymmetrical link from the seed associated with the user to the linked seed;
   connecting a seed associated with the user to at least one other seed, thereby establishing a symmetrical connection between the seed associated with the user and the connected seed; and
   offering predetermined actions to other users of the network retrieving the seed based on the metadata.

2. The computer-implemented method as claimed in claim 1, wherein the main data is online content, including at least one of a video, an audio file, a game, an application, a blog, a comment, a playlist, an activity, a chat, news, a message, communication media, a TV show, a picture, a representation of a user, or a representation of a group of users, and wherein the at least one metadata indicates how the seed shall be handled if retrieved by a user.

3. A computer system for running a social network consisting of a plurality of members, said computer system being configured to perform a method for management of online content in a network including:
   organizing online content in a seed that is accessible by users of the network via said network and that comprises main data and at least one metadata attached to the main data, wherein the seed is connected or linked to other seeds to thereby form a network of seeds;
   linking a seed associated with a user of the users of the network to at least one other seed, thereby establishing a passive, asymmetrical link from the seed associated with the user to the linked seed; and
   connecting a seed associated with the user to at least one other seed, thereby establishing a symmetrical connection between the seed associated with the user and the connected seed,
   wherein the metadata offer predetermined actions to other users of the network retrieving the seed.

4. The computer system as claimed in claim 3, wherein the main data is online content, including at least one of a video, an audio file, a game, an application, a blog, a comment, a playlist, an activity, a chat, news, a message, communication media, a TV show, a picture, a representation of a user, or a representation of a group of users, and wherein the at least one metadata indicates how the seed shall be handled if retrieved by a user.

5. A non-transitory, computer-readable storage medium having stored thereon instructions configured to, in response to execution by a processor, cause said processor to:
   organize online content in a seed that is accessible by users of the network via a network and that comprises main data and at least one metadata attached to the main data, wherein the seed is connected or linked to other seeds to thereby form a network of seeds;
   link a seed associated with a user of the users of the network to at least one other seed, thereby establishing a passive, asymmetrical link from the seed associated with the user to the linked seed; and
   connect a seed associated with the user to at least one other seed, thereby establishing a symmetrical connection between the seed associated with the user and the connected seed,
   wherein said instructions further cause said processor to offer predetermined actions to other users of the network retrieving the seed based on the metadata.

6. The computer-readable storage medium as claimed in claim 5, wherein the main data is online content, including at least one of a video, an audio file, a game, an application, a blog, a comment, a playlist, an activity, a chat, news, a message, communication media, a TV show, a picture, a representation of a user, or a representation of a group of users, and wherein the at least one metadata indicates how the seed shall be handled if retrieved by a user.

7. The computer-implemented method as claimed in claim 1, further including:
   creating a seed by defining a seed type by the user;
   prompting the user to add specific content for the created seed;
   automatically detecting parameters for the created seed; and
   transferring the created seed to an online database of the network.

8. The computer-implemented method as claimed in claim 7, further including:
   providing a proposal of the automatically detected parameters to the user; and
   changing the proposed parameters.

9. The computer-implemented method as claimed in claim 1, wherein the user is notified about any changes or updates of the linked seed.

10. The computer-implemented method as claimed in claim 1, wherein both the seed associated with the user and the connected seed are aware of the connection and wherein an owner of the connected seed has to allow the connection.

11. The computer system as claimed in claim 3 comprising a plurality of seed servers, wherein at least some of the seeds are connected across a plurality of servers and/or clouds through the plurality of seed servers.

* * * * *